United States Patent [19]

Girard

[11] Patent Number: 5,128,657
[45] Date of Patent: Jul. 7, 1992

[54] DEVICE FOR REMOTE SURVEILLANCE OF THE CURRENT SUPPLY TO AN ELECTRICAL APPARATUS

[76] Inventor: Francois Girard, 29 rue Eugéne Bussiére-21000, Dijon, France

[21] Appl. No.: 582,500

[22] Filed: Sep. 14, 1990

[30] Foreign Application Priority Data

Sep. 15, 1989 [FR] France .................................. 89 12145

[51] Int. Cl.$^5$ ............................................. G08B 21/00
[52] U.S. Cl. .................................... 340/654; 340/635; 379/39; 324/133
[58] Field of Search ................ 340/585, 654, 656, 635; 379/39, 106; 324/133

[56] References Cited

U.S. PATENT DOCUMENTS

| | | | |
|---|---|---|---|
| 3,922,490 | 11/1975 | Pettis | 379/107 |
| 4,028,688 | 6/1977 | Goleman | 340/585 X |
| 4,777,479 | 10/1988 | Hinckley | 340/644 |

FOREIGN PATENT DOCUMENTS 8707105 11/1987 PCT Int'l Appl. .

*Primary Examiner*—Jin F. Ng
*Assistant Examiner*—Jeffery A. Hofsass
*Attorney, Agent, or Firm*—McAulay Fisher Nissen Goldberg & Kiel

[57] ABSTRACT

The present invention is concerned with a device for observing from a distance the change of mode in feed current by city current of an electrical appliance by means of a telephone line characterized in that it comprises: means for detecting the presence or the absence of city current to the feed terminals of the electrical appliance, control means, triggered by the detecting means when there occurs a change of mode in the feed of said electrical appliance, switch means, capable of placing the telephone line either in a first free position or in a second engaged position, the control means acting upon the switch means to reverse the position of the telephone line when the detecting means detect a change of mode in the feed of said electrical appliance by city current. (FIG. 1).

18 Claims, 3 Drawing Sheets

DEVICE FOR REMOTE SURVEILLANCE OF THE CURRENT SUPPLY TO AN ELECTRICAL APPARATUS

The present invention is concerned with a device for observing from a distance the electric current feed of an apparatus, for example, a household appliance such as a freezer.

Equipment is known which, by means of suitable electronic means, makes it possible through a telephone circuit to call a correspondent to give him a previously recorded message as a result of the occurrence of an event, and particularly of current stoppage to electrical apparatus.

In addition to the fact that such devices, because of the complexity of their construction, are of a relatively high cost price, they moreover have the disadvantage of triggering the call from a distance at the moment when the event occurs, so that some time after the occurrence thereof, the user does not have means of finding out if the event in question continues to take place or has been interrupted. However, the user is not, evidently, constantly near a telephone, so that the observation means above mentioned are not completely efficient.

There is also known from U.S. Pat. No. 3,992,490 a device for transmitting from a distance data using telephone lines. However, such a device is, on the one hand, designed so as not to interfere with normal use of the telephone and, on the other hand, does not make it possible to detect a change of mode at the feed terminals of an electrical appliance with the city current.

The present invention has for an object a device of the previously mentioned type, which is particularly simple in construction and therefor of a relatively modest cost price, which does not require sophisticated electronic circuits, which gives it great reliability, and which makes it possible, by calling the telephone network, to find out if the current feed to an electrical appliance fed by city current, in particular a household appliance, is or has been interrupted during a given time.

To this effect, this device for observing from a distance the change of current mode feed by city current to an electrical appliance by means of a telephone line is characterized in that it comprises means for detecting the presence or the absence of current from the city supply to the feed terminals of the electrical appliance, control means, triggered by the detection means, when there occurs a change of mode in the supply of said electrical appliance, switch means, capable of placing the telephone line either in a first free position or a second busy position, the control means acting upon the switch means to reverse the position of the telephone line when the detecting means detect a change of mood in the supply of said electrical appliance by city current.

The present invention thus is based upon the use of a specific characteristic of telephone lines and consists, in order to make use of a given telephone, in connecting between two particular terminals a voltage resistance of a given rating, ranging between 500 and 1200 ohms.

In an interesting modification of the invention, the device is provided with timing means which maintain the connection of the voltage resistance only after the occurrence of a current shutoff of a given duration, optionally controlled by the user, according to the appliance on which it is used. For example, in the case of using the present device with a freezer, the duration of the timing will be of the order of several hours, that is to say, corresponding to the average time during which frozen foodstuff can be stored in a freezer, which is not supplied with current, before the thawing process occurs.

There will be described hereafter, by way of non-limiting examples, various embodiments of the present invention, reference being had to the accompanying drawing in which.

Figure 1:
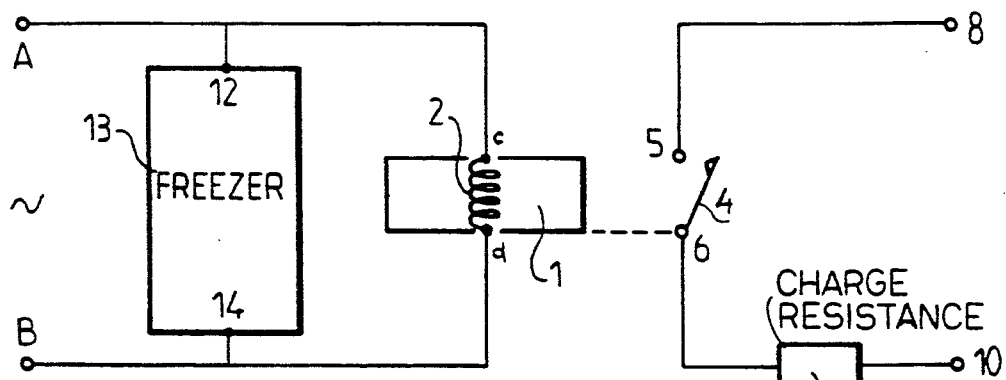
FIG. 1 is a schematic view of a first embodiment of the electronic circuit of a device according to the invention.

In FIG. 1 which shows the simplest embodiment of a teledetecting device according to the invention, an apparatus 13, such as for example a freezer, whose proper functioning it is desired to control from a distance, is connected, through its supply terminals 12 and 14, to the AC electric network (Terminals A and B). The coil 2 of a relay 1 is connected in parallel by its terminals c and d on the terminals A and B of said electric network. This relay 1 comprises switch means 4 which constitute the commutating means, themselves made up of two contacts 5 and 6, in contact during inoperative mode, that is, when the relay is not energized, so that in this position the electrical circuit is closed, while it is opened (FIG. 1) when the relay receives current. Contacts 5 and 6 are connected to terminals 8 and 10 of the network of telephone wires between which is applied a continuous voltage of 48 volts. A resistance 15 rated at 1000 ohms is positioned in series in the circuit made up of terminal 8, contacts 5 and 6 and terminal 10.

Consequently, when network current is present, to terminals c and d of its coil 2, relay 1 is in operative position and terminals 5 and 6 (FIG. 1) are not in contact. Under these conditions the resistance 15 is not connected to terminals 8 and 10, and consequently the "busy" signal does not appear on the telephone line, and the telephone to whose terminal the present device is connected emits, when called from another telephone, the characteristic signal "free".

When the current supplied by the city supply is cut off, the coil 2 of relay 1 no longer receives current, and goes over to the inoperative mode, and its contacts 5 and 6 then are connected making the connection of charge resistance 15 to terminals 8 and 10 of the telephone network. Under these conditions, the telephone to whose terminals the present device is connected emits, when called from another telephone, the characteristic signal "busy".

The user, thus, is able to call the telephone line to which is connected the present device, and the signal "free" or "busy" will tell him about the supplied or not supplied mode of the device and accordingly of the appliance 13 with which it is connected in parallel.

It will be understood that the present device can be used with any type of appliance other than household appliances, and makes it possible to find out, from a distance, by means of a simple telephone call if a given appliance is or is not supplied by city current.

Figure 2:
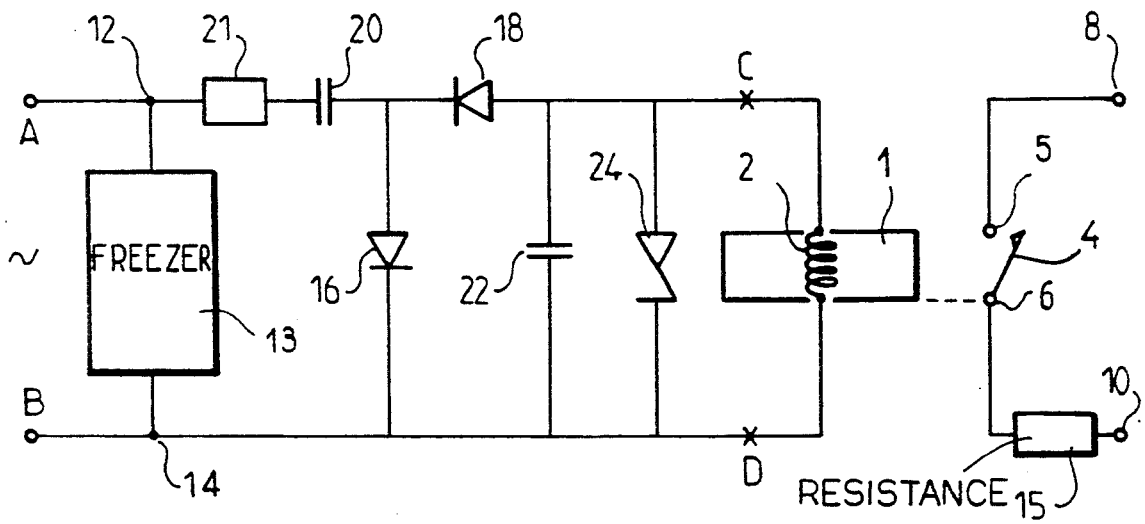
FIG. 2 is a schematic view of a modification of an embodiment of the electronic circuit of a device according to the invention, comprising means for supplying direct current to the detecting means.

In order to better stabilize relay 1, and as shown in FIG. 2, the same is supplied through means for rectifying the current made up, in known manner, of rectifying diodes 16 and 18 and of a filter condenser 22. A reducing impedance made up of resistance 21 and of condenser 20 lowers the voltage which is then stabilized by a Zener diode 24. The filtered and rectified voltage stabilized at 12 volts, available between points C and D, is supplied to coil 2 of a relay 1. The latter actuates in the previously described fashion, contacts 5, 6 which are in contact in inoperative position, that is when the relay is not energized. The operation of such a device takes place as previously described.

Figure 3:
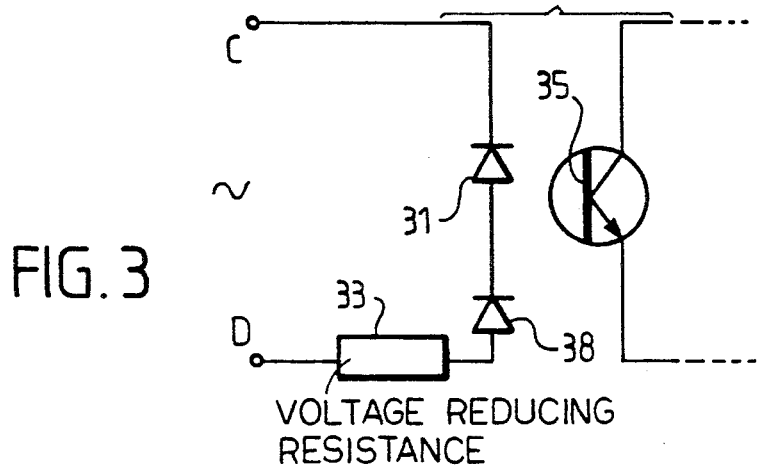
FIG. 3, is a schematic view of a modification of the detecting and control means of the device according to the invention.

In FIG. 3 the detection and control means are constituted by a photoemitting diode 31, of the type "LED", which takes the place of the coil of the relay, and which is connected, through a voltage reducing resistance 33 and a rectifying diode 38, to two terminals C and D which deliver a stabilized low voltage. The light emitted by this diode 31, when the device is supplied with current from city current, is received by switch means made up of a phototransistor 35, whose emitter and collector are connected to a suitable electronic circuit which has a high impedance and fed by a 48 volts voltage from the telephone network. This device ensures a practically perfect uncoupling of the two electric and telephone circuits.

Figure 4:
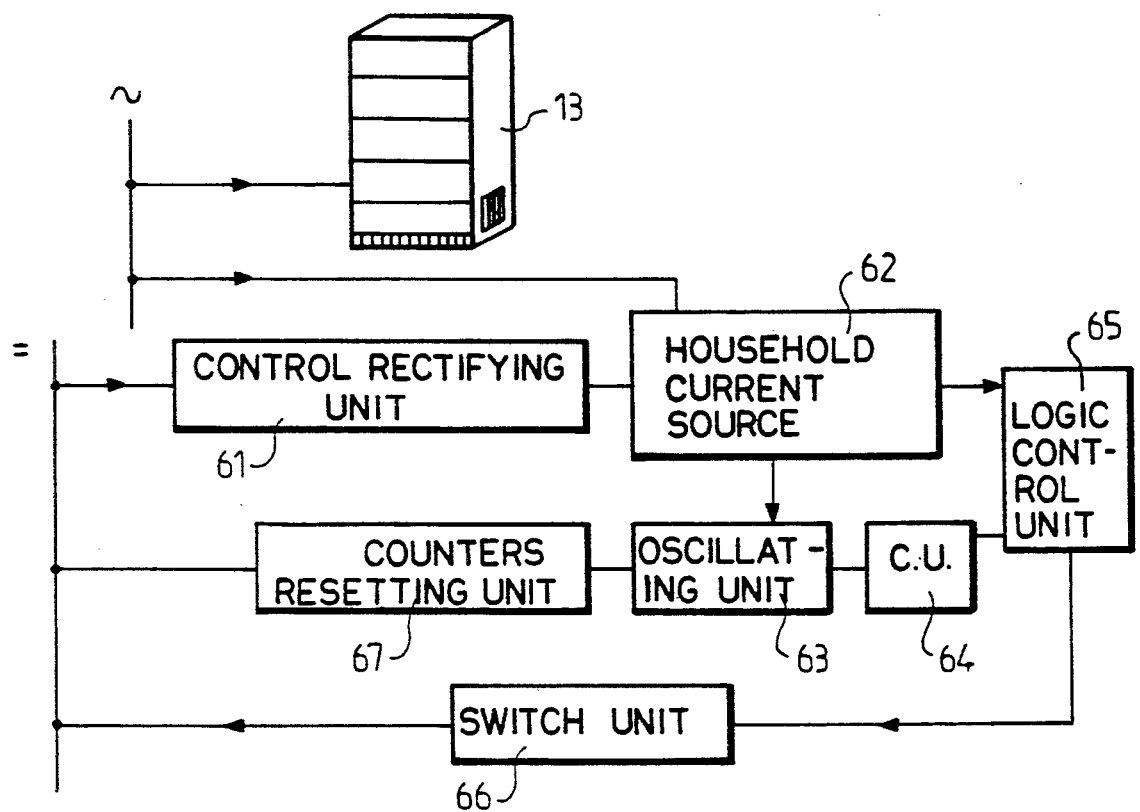
FIG. 4 is a schematic view showing the assembly of different electronic units forming a modification of a device according to the invention.
Figure 6:
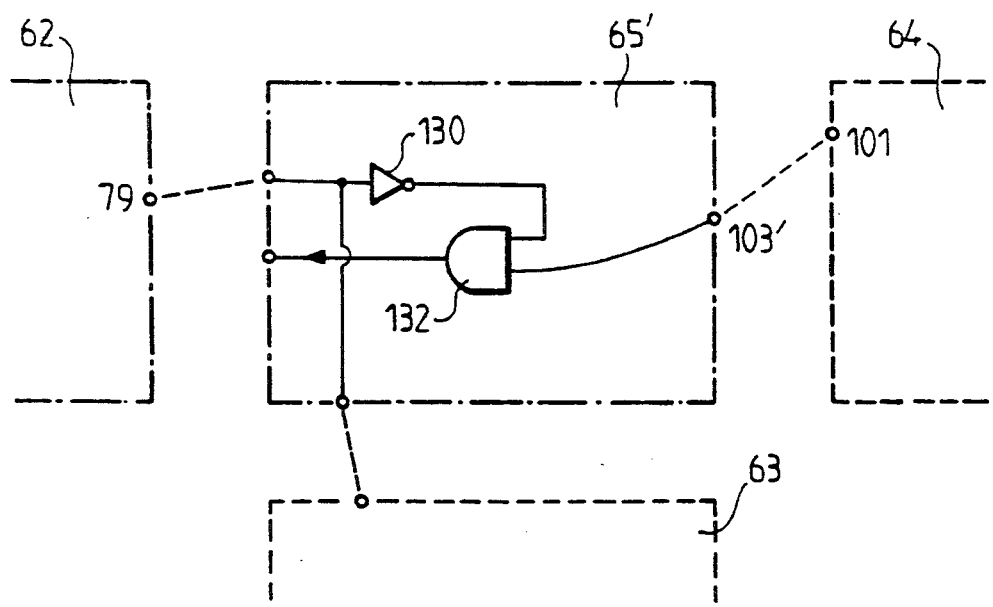
FIG. 6 is a modification of a logic unit of FIG. 5.

FIGS. 4 and 6 provide timing means. The observation device thus comprises a series of electronic units, that is to say a control rectifying unit 61, a unit for detecting the absence of current from the city or household current source 62, an oscillating unit 63, a counter unit 64, a logic control unit 65, a switch unit 66 and a unit for resetting counters 67 to zero.

Unit 61 is made up, in known manner, of a rectifying diode 70 and of a filter cell constituted by a Zener diode 71 and a filter condenser 72 and a resistance 73. It will be noted that such rectifying is necessary because this line transmits in addition to DC voltage an alarm voltage, which has a series of AC components.

The unit for detecting the absence of city current 62 is constituted by a circuit of the type described in FIG. 3, but in addition has between the collector of a transistor 36 and the ground a resistance 75 and a filter capacitor 77, positioned between the base of phototransistor 36 and the output 79 of unit 62. In addition, emitter diode 31 and phototransistor 36 are positioned in the same casing and form an optical coupler 39.

The oscillating unit 63 is made up, in known manner, of two NAND gates 83 and 85 associated with resistances 87 and 89 and with condensers 91 and 93. Resistance 89 is variable and makes it possible to vary the frequency of the oscillator. The oscillating unit comprises an input 94, connected to logic unit 65 which controls the starting and the stopping of the oscillator and an output terminal 95 connected to the counting unit 64.

The counting unit 64 here is constituted by two identical counters, an upstream counter 97 and a downstream counter 99. The clock input of the upstream counter is connected to the output 95 of oscillating unit 63 and its output is connected to the clock input of the downstream counter 99, and the output 101 of the latter is connected to the input 103 of logic unit 65. The two terminals 105 for resetting to zero counters 97 and 99 are connected to the output 107 of the zero reset unit 67.

The logic control unit 65 consist of two NAND gates 109 and 111. One of the inputs of gate 111 is connected to a supply of DC voltage Vcc and therefore is permanently at a positive voltage, and its other input is connected to the output 101 of counter unit 64. The output of gate 111 is connected, through a resistance for limiting the current 113 and a diode 115 to the input 117 of the switch unit 66 through a second current limiting resistance 119. One of the inputs 110 of the gate 109 is connected to the output 79 of the unit for detecting the absence of city current 62 and its other terminal 112 is connected to the output of gate 111.

The switch unit 66 consists of a switch transistor 121 whose base is connected to the input 117 of the unit, and an emitter is connected to one of the terminals 10 of the telephone line and the collector is connected to another terminal 8 of the telephone line through a charge resistance 123 of about 1200 ohms.

The coil of relay 1, the photoemitting diode 31 and the unit 62 for detecting current from the city or household current forms a detecting means which is electrically isolated from the switch means 4 including the photoresistor 35 and switch unit 66.

In order to simplify the explanations relating to the operation of the present device, it is understood that, in the following part of the present text, a terminal will be designated as being at 0 or at 1 when this terminal will be respectively at a voltage equal to 0 and to a positive voltage, with respect to the ground of the circuit.

Under these conditions, the operation of the present device is as follows: when the circuit is connected to terminals 8 and 10 described previously of the telephone line, the zero reset unit 67 generates on its terminal 107 an impulse placing at zero counters 97 and 99, and the output terminal 101 of counting block 64 goes to 0. Consequently, the output of the NAND gate 111, and therefore the second input 112 of the NAND gate 109 goes to 1. When city current is present at terminals A and B of the circuit, the electroluminescent diode 31 emits a beam received by phototransistor 35 which from then on conducts and which sets at 1 the input 110 of the NAND gate 109. The second input of this gate NAND being also at 1, its input is then at 0 and transistor 121 of the switch unit means 66 then does not conduct. The charge resistance 123 is therefore not connected to terminals 8 and 10 of the telephone line.

When city current is cut off, the electroluminescent diode 31 not now being fed with current, no longer lights, and phototransistor 35 no longer conducts, so that the input 110 of NAND circuit 109 is then at 0. The output of this NAND 109 gate is therefore at 1 which makes the switch transistor 121 conductive, and thereafter the charge resistance 123 is connected to terminals 8 and 10 of the telephone line, thus simulating the engaged mode of the line. During the same time, the oscillator is started and sends impulses, at a frequency depending on the rating of the adjustable resistance 89, towards counter 97.

If re-establishment of city current occurs before counter 99 has received from the oscillator a number of impulses sufficient to block it and to bring its output 101 to 1, the output terminal of NAND circuit 109 returns to 0, and the charge resistance 123 is disconnected, thus placing the telephone line in the "free" mode.

If the city current is again interrupted, the preceding process is triggered again and counters 97-99 record a number of additional impulses added to the previously entered impulses. When, following a given interruption time, counter 99 reaches its maximum count, its output 101 exceeds 1 as well as the second input of the NAND gate 111. The output of the latter passes to 0, as well as the input 112 of the NAND gate 109. The output of the latter therefore passes to 1 and the switch transistor 121 then becomes supplied and passes to the conductive state which switches the charge resistance 123 to terminals 8 and 10 of the telephone line.

It will be noted that, regardless of the state at the input 110 of the NAND gate 109, the output thereof remains at 1 and the switch transistor 121 is blocked in conductive position and the simulation of the "busy" mode continues, until counters 97 and 99 are reset to 0, which occurs by disconnecting the device from the telephone outlet.

The user therefore knows that either the current has been shut off to the terminals of his apparatus, or that the current has been shut off during at least a time equal to the timing he has set, by means of adjustable resistance 89.

Figure 5:
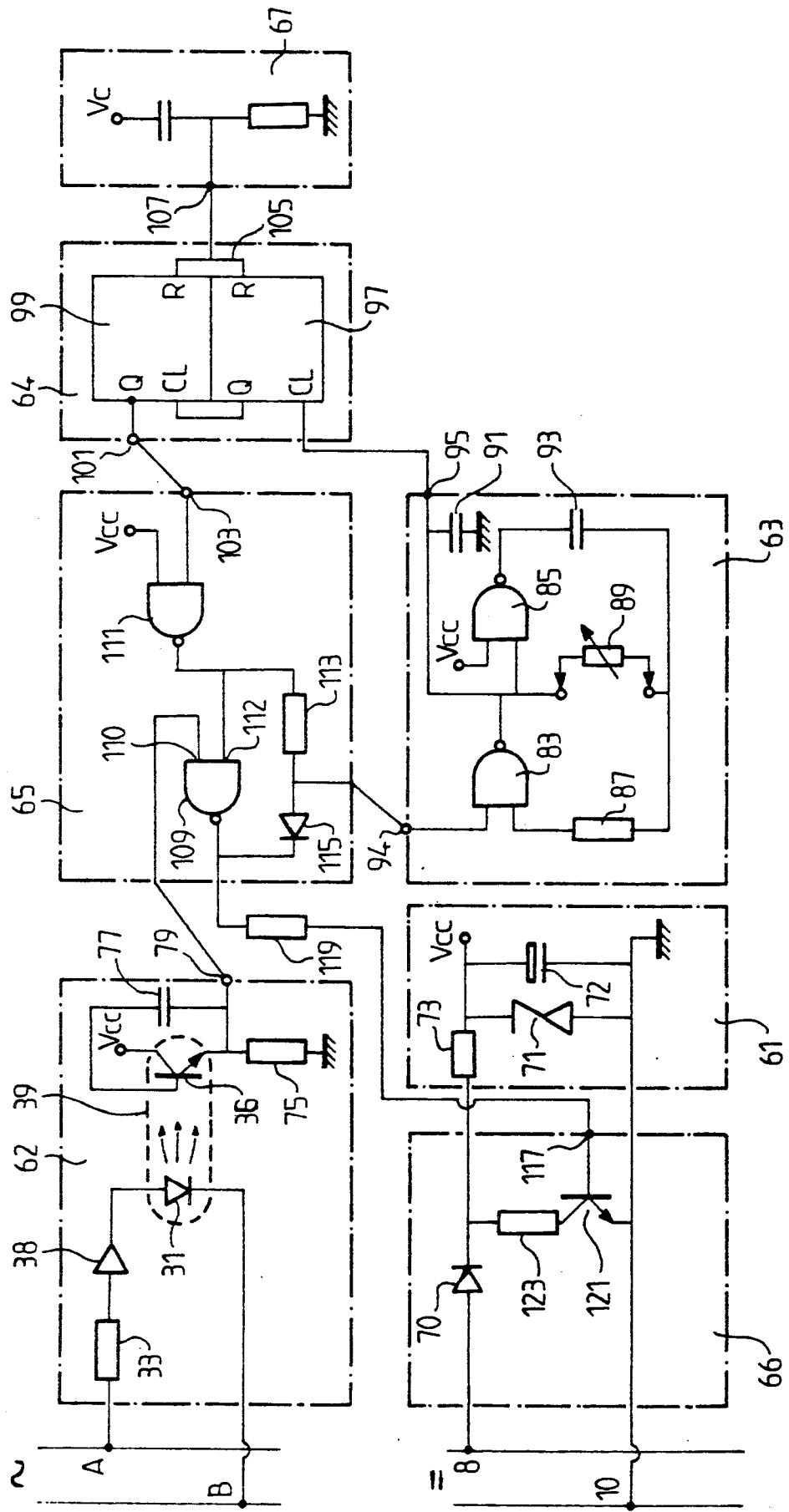
FIG. 5, is a detailed view of each of the electronic units making up the device of FIG. 4.

It would be possible also to replace the logic control module 65 of FIG. 5 by a module 65', shown in FIG. 6, and making it possible to switch the telephone line to "busy" mode only after an interruption of a given time.

Thus, in FIG. 6, the output 79 of the unit for detecting the absence of city current 62 is connected to the input of an invertor 130, whose output is connected to one of the inputs of an AND gate 132, the other input of this AND gate being connected to input 103' of unit 65', itself connected to the output 101 of counter unit 64. Thus, when the city current is shut off the voltage at the output 79 of unit 62 goes over to 0, as previously seen, which starts the oscillator and causes the output of invertor 130 to go to 1. Under these conditions, as soon as the output of the counter unit 62 goes to 1, which takes place at the end of a given time set by the user, the output of AND gate 132 goes over to 1 and the switch of the charge resistance 123 takes place as previously described.

I claim:

1. A device for observing from a distance the change of mode of current feed by city current to an electric appliance by means of a telephone line (8,10) in which the telephone line can be checked from a distance away from the electric appliance by calling the telephone line for checking the status of the telephone line and determining whether the telephone line is busy or not, thereby determining the current feed, comprising:
    detection means (2,31,62) for detecting the presence or the absence of city current to the feed terminals (12,14) of the electric appliance (13),
    control means (2,31,65) triggered by the detecting means (2,31,62) when there occurs a change of mode in the feed of said electric appliance (14),
    switch means, (4,35,66) capable of placing the telephone line (8,10) either in a first free or non-busy state or in a second engaged or busy state, and
    the control means (2,31,65) acting on the switch means (4,35,66) to reverse the state of the telephone line when the detecting means detect a change of mode in the feed of said electrical appliance (14) by household current.

2. The device according to claim 1 wherein the detection means (2,31,62) are electrically isolated from said switch means (4,35,66).

3. The device according to claim 1, wherein the switch means (4,35,66) connect an electrical resistance (15,123) to terminals (8,10) of the telephone line giving a "busy" mode, said electrical resistance having a rating between 500 and 1200 ohms.

4. The device according to claim 3 wherein the electrical resistance (15,123) is connected when the city current is cut off.

5. The device according to claim 1 wherein the detection means for detecting the presence or the absence of current at the terminals of the electrical appliance (14) are constituted by means for emitting beams of light (31).

6. The device according to claim 5 wherein said beam emitting means is a photoemitting diode (31).

7. The device according to claim 1 wherein the control means comprise a phototransistor (36).

8. The device according to claim 1 wherein the detection means (31) and control means (35) are constituted by an optical coupler.

9. The device according to claim 1 including an electric supply for the control means (2,31,65) and/or switch means (4,35,66), said electrical supply means being affected by telephone line (8,10) voltage.

10. The device according to claim 9 include rectifying means (70), filtering means (72,73) and stabilizing means (71) for the voltage supplied by the telephone line.

11. The device according to claim 1 wherein the detection means (62) and the control means (65) are connected with timing means (63,64).

12. The device according to claim 11 wherein the timing means (63,64) are constituted by a frequency adjustable oscillator, feeding counting means (97,99).

13. The device according to claim 11 wherein the control means includes electronic logic means (65) and timing means (67, 97, 99) maintaining connection of a charge resistance (123), after the lapse of a given time from a first interruption of current as a result of a first disappearance of city current.

14. The device according to claim 11 wherein the control means includes electronic logic means (65) maintaining connection of the switch means, after the lapse of a given time from a first interruption, this time beginning at the instant of the first cut in city current occurring after connection of the device with the telephone line.

15. The device according to claim 2, wherein the switch means (4,35,66) connect an electrical resistance (15,123) having a rating between 500 and 1200 ohms to terminals (8,10) of the telephone line to provide a "busy" mode when current passes through said electrical resistance.

16. The device according to claim 5, including an electrical resistance (15,123) which is connected when the city current is cut off.

17. The device according to claim 1, wherein the control means includes a logic control unit for maintaining connection of a charge resistance (123), after the elapse of a given time, from a first interruption causing disappearance of city current.

18. The device according to claim 1, including a logic control unit forming part of said control means to maintain connection of the switch means, after a lapse of a given interruption time from a first interruption, this given interruption time beginning at the instant of a first cut in city current occurring after connection of the device with the telephone line, and comprising durations related to the duration of future interruptions in current.

* * * * *